United States Patent [19]

Knoepke et al.

[11] 4,350,524

[45] Sep. 21, 1982

[54] PROCESS FOR REMOVAL OF BASE METAL IMPURITIES FROM MOLTEN SILVER WITH SULFUR HEXAFLUORIDE

[75] Inventors: John R. Knoepke; David B. George, both of Salt Lake County, Utah

[73] Assignee: Kennecott Corporation, Salt Lake City, Utah

[21] Appl. No.: 264,009

[22] Filed: May 15, 1981

[51] Int. Cl.$^3$ .............................................. C22B 11/02
[52] U.S. Cl. ........................................ 75/63; 75/65 R; 75/83; 75/93 E; 75/113
[58] Field of Search ..................... 75/83, 63, 65, 93 E, 75/113

[56] References Cited

U.S. PATENT DOCUMENTS

| | | | |
|---|---|---|---|
| 3,958,980 | 5/1976 | Szekely | 75/93 E |
| 4,010,030 | 3/1977 | French | 75/93 E |
| 4,086,084 | 4/1978 | Oliver | 75/113 |
| 4,242,124 | 12/1980 | Makipirtti | 75/113 |

*Primary Examiner*—M. J. Andrews
*Attorney, Agent, or Firm*—Philip A. Mallinckrodt

[57] ABSTRACT

A method of pyrometallurgical refining of crude silver to remove base metal impurities, particularly bismuth, by treatment with sulfer hexafluoride gas. The crude silver is melted and maintained at about 1000° C. while it is treated concurrently with sulfur hexafluoride and an oxidizing gas, such as air. Base metal fluorides are formed and are removed from the silver, after which the molten bath is treated with a reducing agent, such as hydrogen gas.

14 Claims, No Drawings

PROCESS FOR REMOVAL OF BASE METAL IMPURITIES FROM MOLTEN SILVER WITH SULFUR HEXAFLUORIDE

BACKGROUND OF THE INVENTION

1. Field

The invention is in the field of processes for refining silver, particularly for removing base metal impurities from silver.

2. State of the Art

The American Society for Testing and Materials (ASTM) has established a standard for commercial grade silver. This standard, referred to as Specification B413-69, establishes maximum amounts of certain impurities which may be present. For example, the ASTM Specification B413-69 for Grade 99.90 silver provides that the sample must contain at least 99.90 percent silver, but must contain no more than 10 parts per million (ppm) bismuth, 800 ppm copper, 20 ppm iron, and 250 ppm lead.

One method of refining crude metallic silver to commercial purity is by electrolysis. Electrolytic refining is accomplished by casting the crude silver into anodes and applying current, whereby the silver from the anode precipitates as silver crystals. The crystals are then melted and cast into bars. This method is effective to remove impurities from the silver, but has the disadvantages of being slow and requiring a relatively large amount of crude silver for effective operation.

A pyrometallurgical refining method is a less expensive, and thus preferred, method of refining crude silver to commercial purity. This method requires melting the crude silver, treating it with a gaseous chemical to remove impurities, and then pouring the purified sliver into bar molds. This method is faster than electrolytic refining and requires less of the crude silver. As a result, the valuable silver is held up in inventory for a considerably shorter period of time than in an electrolytic refining operation, and other significant cost savings are also realized.

However, existing pyrometallurgical refining techniques prior to the present invention were not capable of removing bismuth to a commercially acceptable degree. Thus, where crude silver has contained significant amounts of bismuth, it has heretofore been necessary to employ the more costly electrolytic refining process.

SUMMARY OF THE INVENTION

The process of the present invention decreases the concentration of many impurities found in crude silver, including bismuth, to acceptable levels by use of a pyrometallurgical refining step.

Crude metallic silver is heated to about 1000° C., the minimum temperature at which it will be molten, and sulfur hexafluoride gas ($SF_6$) is bubbled therethrough along with an oxidizing gas, such as air, the air being used to oxidize any sulfur left in the silver to sulfur dioxide, and also to agitate the molten bath.

The $SF_6$ gas reacts with various constituents of the molten bath to form fluorides, which are either volatile and pass off as a gas or form a slag which is separated from the remainder of the molten material in the usual manner. The base metals (bismuth, lead, antimony, tin, etc.) are removed in this way. The noble metals (gold, platinum, palladium, etc.) are not removed. Also, copper is not removed to sufficiently low levels to meet ASTM specifications.

After treatment with $SF_6$ and the oxidizing gas, and preferably after removal of the impurities, a reducing agent can be used to deoxidize and defluoridize the bath. Such a reducing agent may be hydrogen gas, propane, or calcium metal.

DETAILED DESCRIPTION

As already mentioned, crude metallic silver contains various impurities. A common impurity, which heretofore has been removable only by electrolytic refining techniques, is bismuth. The present invention provides for removal of base metal impurities, particularly bismuth, by a pyrometallurgical refining step.

This is accomplished by raising the temperature of the crude silver until it is molten. The melting point of pure silver is 960.8° C. and its boiling point is 2212° C. Although the process of the invention will work at any temperature in this range, it is preferable to maintain the temperature as close to the melting point as possible. First, as the temperature of the molten bath is raised, the vapor pressure of silver increases, and more and more silver will be lost due to volatilization. Second, working at a lower temperature is more economical because of lower overall energy costs. It is also important to note that some silver will react with the $SF_6$ to form AgF. The vapor pressure of AgF is several orders of magnitude greater than that of silver so that loses of silver by volatilization of AgF is quite significant. Use of a relatively low temperature minimizes volatilization of AgF. Increasing the temperature of the bath from 1000° C. to 1050° C. increases the vapor pressure of AgF by more than 50%. Also, the reactivity of $SF_6$ decreases significantly with temperature so that less AgF will form at lower temperatures.

After the crude silver is melted, it is treated with sulfur hexafluoride gas ($SF_6$). Variables, such as flow rates, treatment times, and quantities of $SF_6$ gas required, will vary depending upon the geometry of the reaction vessel and the amount of impurities in the silver. The exact method of injection of $SF_6$ is not critical, the aim being to bring $SF_6$ gas into contact with, and thus react with, impurities. It is desirable to inject an oxidizing gas concurrently with injection of $SF_6$ gas so as to agitate the bath, thus insuring that all of the molten bath comes into contact with the $SF_6$ gas, and also to oxidize any sulfur which is left in the bath as a result of reactions of $SF_6$ with either impurities or silver. In general, the fluorides formed will be volatile, and thus will leave the bath as a gas. However, some fluoride may be insoluble and may form a slag.

In general, the reactions are similar to those for bismuth:

$$SF_6 + 2Bi_{Ag} \rightarrow 2BiF_3(g) + S_{Ag}$$
$$S_{Ag} + O_2 \rightarrow SO_2(g)$$

Elements which can be removed using this process are generally those which form their fluorides more readily than silver fluoride is formed. Thus, base metal impurities, such as bismuth, lead, antimony, tin, arsenic, etc. can be removed by treatment of a silver bath with $SF_6$ gas. On the other hand, the noble metals (gold, platinum, palladium, etc.) cannot be removed from silver using this method since silver fluoride forms more readily than the fluorides of these metals. It should be noted that although copper fluoride is more readily formed than silver fluoride, the equilibrium between silver and copper prevents the extraction of copper to acceptable levels.

In order to insure removal of the impurities, but to avoid excess AgF formation, it is desirable to use as little $SF_6$ gas as possible. It has been found from the following examples that no more than 60 cc of $SF_6$ gas should be required per Troy ounce of silver. A calculated stoichiometric amount based on silver having 0.1% impurities would be about 2 cc of $SF_6$ gas per Troy ounce of silver. The experiments set forth in the examples showed that the test procedure required a minimum of about 13 cc of $SF_6$ gas per Troy ounce of silver for acceptable results. However, varying the geometry of the reaction vessel, or making other changes could allow use of lesser volumes of $SF_6$ gas per Troy ounce of silver. Even if 60 cc of $SF_6$ per Troy ounce of silver were used, and even if all of the $SF_6$ were to react with silver to form AgF, there would be a maximum silver volatilization of about 5.6%. Of course, in practice the amount of silver volatilization would actually be considerably less, since the impurities in the silver are competing for the available fluoride, especially since the fluorides of the impurities form more readily than silver fluoride. Also, some of the AgF wil back-react with metal impurities, so that the metal fluorides are formed.

After treatment with $SF_6$, and elimination of the impurities, it is desirable to deoxidize and defluoridize the molten bath before casting the silver into bars. Both of these reactions may be accomplished simultaneously by bubbling a reducing gas, such as hydrogen, through the bath or by adding a solid or liquid reducing agent, such as calcium metal to the bath.

As a result of the $SF_6$ treatment, some impurities are volatilized and, thus, leave the molten bath as a gas. Others form a slag. If the slag is not removed prior to treatment with the reducing agent, the impurities in the slag will be reduced once more, and will reenter the silver. In the examples which follow, none of the slag that was formed was removed prior to treatment with hydrogen gas because of the small volumes of silver used and the very small amount of slag that formed. As a result, some of the examples show final impurity levels higher than earlier samples.

After treatment with the reducing gas the molten silver may be poured into molds and allowed to cool.

In the examples which follow, most of the tests were performed using pure silver which had been doped with the appropriate metal impurities. In each test, with the exception of Example 9, the silver sample was placed into a high purity alumina crucible measuring 1.25 inches in diameter and 2.5 inches deep. The silver sample was melted and held at approximately 1000° C. throughout the refining process. Approximately 100 cc/min of air was continuously injected into the molten bath through a high purity alumina tube having an inside diameter of about 1/32 inch, and which was positioned so as to form gas bubbles near the bottom of the bath. For these small tests, an effective flow rate of $SF_6$ for continuous operation would have been about 2 cc/min. Available equipment was incapable of delivering this small volume of $SF_6$, so it was metered into the bath at a flow rate of about 20 cc/min for about five minutes out of each hour. About 55 minutes after each introduction of $SF_6$, a sample of silver was aspirated into a 98% silica glass tube and analyzed for metal impurities. After completion of the treatment with $SF_6$, hydrogen gas was bubbled through the silver for approximately one hour. Following treatment with hydrogen, the silver was furnace-cooled under a hydrogen atmosphere and then drilled to obtain a final sample. Excess $SF_6$ and hydrogen gas were purposely used, because available equipment was inadequate to determine when a sufficient amount had been added.

EXAMPLE 1

A sample of impure silver weighing 16.3 Troy ounces (502.8 grams) was treated with $SF_6$, air, and hydrogen gas in the above-described manner. The results are detailed in the following table:

| Cumulative Volume of $SF_6$ added (cc) | Specific Volume of $SF_6$ used (cc/T oz) | Volume of $H_2$ added (cc) | Specific Volume of $H_2$ used (cc/T oz) | Chemical analysis after gas addition (ppm) | | | | | | |
|---|---|---|---|---|---|---|---|---|---|---|
| | | | | Bi | Pb | Sn | Sb | Cu | S | F |
| 0 | 0 | 0 | 0 | >100 | — | — | — | — | — | — |
| 110 | 6.7 | 0 | 0 | 140 | — | — | — | — | — | — |
| 220 | 13.5 | 0 | 0 | 13 | — | — | — | — | — | — |
| 396 | 24.3 | 0 | 0 | 9.5 | — | — | — | — | — | — |
| 572 | 35.1 | 0 | 0 | 6 | — | — | — | — | — | — |
| — | — | 10,400 | 636 | 8.5 | — | — | — | — | 2 | 5 |

EXAMPLE 2

A sample of silver weighing 16.0 Troy ounces (498.7 g) was employed in this test performed as a control. Here, no $SF_6$ was added.

| Cumulative Volume of $SF_6$ added (cc) | Specific Volume of $SF_6$ used (cc/T oz) | Volume of $H_2$ added (cc) | Specific Volume of $H_2$ used (cc/T oz) | Chemical analysis after gas addition (ppm) | | | | | | |
|---|---|---|---|---|---|---|---|---|---|---|
| | | | | Bi | Pb | Sn | Sb | Cu | S | F |
| 0 | 0 | 0 | 0 | >500 | — | — | — | — | — | — |
| 0 | 0 | 5900 | 368 | >500 | — | — | — | — | 1 | 14.4 |

EXAMPLE 3

A silver sample weighing 16.7 Troy ounces (520.8 g) was refined in this test.

| Cumulative Volume of $SF_6$ added (cc) | Specific Volume of $SF_6$ used (cc/T oz) | Volume of $H_2$ added (cc) | Specific Volume of $H_2$ used (cc/T oz) | Chemical analysis after gas addition (ppm) | | | | | | |
|---|---|---|---|---|---|---|---|---|---|---|
| | | | | Bi | Pb | Sn | Sb | Cu | S | F |
| 0 | 0 | 0 | 0 | >100 | — | — | — | — | — | — |
| 140 | 8.4 | 0 | 0 | 45 | — | — | — | — | — | — |
| 240 | 14.4 | 0 | 0 | 4.5 | — | — | — | — | — | — |
| 400 | 24.0 | 0 | 0 | 3.0 | — | — | — | — | — | — |
| 580 | 34.7 | 0 | 0 | 3.5 | — | — | — | — | 2 | 260 |
| — | — | 3800 | 227 | 2.5 | — | — | — | — | 4 | 20 |

EXAMPLE 4

Here, 17.2 Troy ounces of silver (535.0 g) was treated with $CF_4$ gas instead of $SF_6$ gas to see whether an alternate fluorine source would effect the desired removal of impurities.

| Cumulative Volume of $CF_4$ added (cc) | Specific Volume of $CF_4$ used (cc/T oz) | Volume of $H_2$ added (cc) | Specific Volume of $H_2$ used (cc/T oz) | Chemical analysis after gas addition (ppm) | | | | | | |
|---|---|---|---|---|---|---|---|---|---|---|
| | | | | Bi | Pb | Sn | Sb | Cu | S | F |
| 0 | 0 | 0 | 0 | >100 | — | — | — | — | — | — |
| 675 | 39.2 | 0 | 0 | >100 | — | — | — | — | — | — |
| 1712 | 99.5 | 0 | 0 | >100 | — | — | — | — | 2 | 26 |
| — | — | 4390 | 255 | >100 | — | — | — | — | 3 | 5.6 |

EXAMPLE 5

This test was used to determine if $SF_6$ would remove sufficient copper from silver so that the sample would meet ASTM specifications. A silver sample weighing 16.5 Troy ounces (512.8 g) was used.

| Cumulative Volume of $SF_6$ added (cc) | Specific Volume of $SF_6$ used (cc/T oz) | Volume of $H_2$ added (cc) | Specific Volume of $H_2$ used (cc/T oz) | Chemical analysis after gas addition (ppm) | | | | | | |
|---|---|---|---|---|---|---|---|---|---|---|
| | | | | Bi | Pb | Sn | Sb | Cu | S | F |
| 0 | 0 | 0 | 0 | — | — | — | — | >500 | — | — |
| 300 | 18.2 | 0 | 0 | — | — | — | — | >500 | — | — |
| 600 | 36.4 | 0 | 0 | — | — | — | — | >500 | — | — |
| 900 | 54.5 | 0 | 0 | — | — | — | — | >500 | — | — |
| 1200 | 72.7 | 0 | 0 | — | — | — | — | >500 | — | — |
| — | — | 3920 | 238 | — | — | — | — | >500 | 2 | 16 |

EXAMPLE 6

A test using 16.3 Troy ounces (506.6 g) of silver was performed to determine whether the procedure would remove selenium. Here, it was expected that the selenium would react with the oxygen in the air to form $SeO_2$ vapor. It is not known why the initial Se chemical analysis was so low.

| Cumulative Volume of $SF_6$ added (cc) | Specific Volume of $SF_6$ used (cc/T oz) | Volume of $H_2$ added (cc) | Specific Volume of $H_2$ used (cc/T oz) | Chemical analysis after gas addition (ppm) | | |
|---|---|---|---|---|---|---|
| | | | | Se | S | F |
| 0 | 0 | 0 | 0 | <1 | — | — |
| 280 | 17.2 | 0 | 0 | 37 | — | — |
| 480 | 29.4 | 0 | 0 | 25 | — | — |
| 680 | 41.7 | 0 | 0 | <1 | — | — |
| 880 | 54.0 | 0 | 0 | <1 | — | — |
| — | — | 5670 | 348 | <1 | 6 | 5 |

EXAMPLE 7

This test was made to observe effects of simultaneous removal of several impurities. A silver sample weighing 16.6 Troy ounces (515.4 g) was used. It is not known why the Sn and Cu analyses varied as they did.

| Cumulative Volume of $SF_6$ added (cc) | Specific Volume of $SF_6$ used (cc/T oz) | Volume of $H_2$ added (cc) | Specific Volume of $H_2$ used (cc/T oz) | Chemical analysis after gas addition (ppm) | | | | | | |
|---|---|---|---|---|---|---|---|---|---|---|
| | | | | Bi | Pb | Sn | Sb | Cu | S | F |
| 0 | 0 | 0 | 0 | >100 | 320 | <1 | 5 | 750 | — | — |
| 160 | 9.6 | 0 | 0 | 15 | 12 | <1 | 2 | 700 | — | — |
| 320 | 19.3 | 0 | 0 | 1.1 | 3 | 1.2 | <2 | 450 | — | — |
| 480 | 28.9 | 0 | 0 | 0.5 | 2.5 | 23 | <2 | 250 | — | — |
| 640 | 38.6 | 0 | 0 | 0.3 | 2.0 | 2 | <2 | 450 | 0 | 200 |

-continued

| Cumulative Volume of SF$_6$ added (cc) | Specific Volume of SF$_6$ used (cc/T oz) | Volume of H$_2$ added (cc) | Specific Volume of H$_2$ used (cc/T oz) | Chemical analysis after gas addition (ppm) | | | | | | |
|---|---|---|---|---|---|---|---|---|---|---|
| | | | | Bi | Pb | Sn | Sb | Cu | S | F |
| — | — | 5780 | 348 | 2.5 | 9 | 9.5 | <2 | 250 | 0 | 9.8 |

EXAMPLE 8

A test similar to that in Example 8 was performed on 16.2 Troy ounces (502.3 g) of silver.

| Volume of SF$_6$ added (cc) | Volume of SF$_6$ used (cc/T oz) | of H$_2$ added (cc) | Volume of H$_2$ used (cc/T oz) | analysis after gas addition (ppm) | | | | | | |
|---|---|---|---|---|---|---|---|---|---|---|
| | | | | Bi | Pb | Sn | Sb | Cu | S | F |
| 0 | 0 | 0 | 0 | >100 | 215 | 3 | 5 | 58 | — | — |
| 160 | 9.9 | 0 | 0 | 8 | 2 | <1 | <2 | 90 | — | — |
| 320 | 19.8 | 0 | 0 | 5 | 8.5 | <1 | <2 | 100 | — | — |
| 480 | 29.6 | 0 | 0 | <1 | 1 | <1 | <2 | 40 | — | — |
| 560 | 34.6 | 0 | 0 | <1 | 2 | <1 | <2 | 55 | — | — |
| — | — | 3820 | 236 | 13 | 250 | 150 | 150 | 500 | 1 | 5.8 | sured 2.75 inches in diameter and the bath depth was approximately six inches. However, once again no attempt was made to remove any slag which formed during treatment.

| Cumulative Volume of SF$_6$ added (cc) | Specific Volume of SF$_6$ used (cc/T oz) | Volume of H$_2$ added (cc) | Specific Volume of H$_2$ used (cc/T oz) | Chemical analysis after gas addition (ppm) | | | | | | |
|---|---|---|---|---|---|---|---|---|---|---|
| | | | | Bi | Pb | Sn | Sb | Cu | S | F |
| 0 | 0 | 0 | 0 | >100 | >500 | 1.5 | <2 | 500 | — | — |
| 140 | 0.9 | 0 | 0 | >100 | >500 | <1 | <2 | 350 | — | — |
| 240 | 1.5 | 0 | 0 | >100 | 200 | <1 | <2 | 250 | — | — |
| 400 | 2.5 | 0 | 0 | >100 | 65 | <1 | <2 | 250 | — | — |
| 600 | 3.7 | 0 | 0 | >100 | 65 | <1 | <2 | 450 | — | — |
| 900 | 5.6 | 0 | 0 | 90 | 60 | <1 | <2 | 410 | — | — |
| 1200 | 7.4 | 0 | 0 | 80 | 6 | <1 | <2 | 300 | — | — |
| 1500 | 9.3 | 0 | 0 | 22 | 2 | <1 | <2 | 200 | — | — |
| 1800 | 11.2 | 0 | 0 | 9 | 2 | <1 | <2 | 250 | — | — |
| 2100 | 13.0 | 0 | 0 | 8 | 6 | <1 | <2 | 250 | — | — |
| 2400 | 14.9 | 0 | 0 | 4 | 2.5 | <1 | <2 | 350 | — | — |
| — | — | 0 | 0 | 4 | 2 | <1 | <2 | 250 | 2 | 180 |
| — | — | 10,500 | 65.1 | 35 | 150 | <1 | <2 | 360 | 0 | 10 |

EXAMPLE 9

This test was run to determine any effect of scaling up the procedure and using continuous flow of SF$_6$ gas. A larger sample, weighing 161.2 Troy ounces (5013.5 g), was employed. In this test, the SF$_6$ flow was still about 20 cc/min but was introduced continuously. The results show that continuous flow of SF$_6$ has the same effect as the intermittent addition of SF$_6$ of the other tests. It can be seen that scaling up the procedure significantly decreases the amount of SF$_6$ gas required to refine each Troy ounce of silver. The air flow was increased to about 260 cc/min. The crucible used for this test measured 2.75 inches in diameter and the bath depth was approximately six inches. However, once again no attempt was made to remove any slag which formed during treatment.

EXAMPLE 10

This test was also performed on crude silver. The first sample was taken before treatment by drilling the solid silver. The second sample was obtained by aspiration from the molten bath. The differences in amounts of impurities found from the two methods differ significantly and may explain some of the erratic analyses obtained in some of the examples. Here, 11.0 Troy ounces (340.9 g) of silver was used. Analyses of the samples showed that palladium present in the silver was not removed.

| Cumulative Volume of SF$_6$ added (cc) | Specific Volume of SF$_6$ used (cc/T oz) | Volume of H$_2$ added (cc) | Specific Volume of H$_2$ used (cc/T oz) | Chemical analysis after gas addition (ppm) | | | | | | |
|---|---|---|---|---|---|---|---|---|---|---|
| | | | | Bi | Pb | Sn | Sb | Cu | S | F |
| 0 | 0 | 0 | 0 | >100 | >500 | <1 | 15 | >500 | — | — |
| | 0 | 0 | 0 | 25 | 100 | <1 | <5 | 160 | — | — |
| 160 | 14.5 | 0 | 0 | <1 | <5 | <1 | <5 | 310 | — | — |
| 320 | 29.1 | 0 | 0 | <1 | <5 | <1 | <5 | 275 | — | — |
| 480 | 43.6 | 0 | 0 | <1 | <5 | <1 | <5 | 160 | — | — |
| 640 | 58.2 | 0 | 0 | <1 | <5 | <1 | <5 | 160 | — | — |
| 800 | 72.7 | 0 | 0 | <1 | <5 | <1 | <5 | 305 | — | — |

-continued

| Cumulative Volume of $SF_6$ added (cc) | Specific Volume of $SF_6$ used (cc/T oz) | Volume of $H_2$ added (cc) | Specific Volume of $H_2$ used (cc/T oz) | Chemical analysis after gas addition (ppm) | | | | | | |
|---|---|---|---|---|---|---|---|---|---|---|
| | | | | Bi | Pb | Sn | Sb | Cu | S | F |
| — | — | 3000 | 273 | <1 | 5 | 4 | 5 | 300 | 6 | 5 |

Whereas the process is here described with respect to a specific procedure presently regarded as the best mode of carrying out the invention, it is to be understood that various changes may be made and other procedures adopted without departing from the broader inventive concepts disclosed herein and comprehended by the claims that follow.

We claim:

1. A process for removing base Metal impurities from silver, comprising the steps of treating a molten bath of metallic silver containing base metal impurities with only that amount of sulfur hexafluoride gas that will form the respective fluorides of said base metal impurities substantially, without alteration of the silver; and removing the resulting base metal fluorides while leaving substantially all of the silver in the molten bath.

2. A process according to claim 1, wherein the base metal impurities include bismuth, lead, tin, and antimony.

3. A process according to claim 1, wherein the temperature of the molten bath is maintained at the minimum temperature at which it will remain molten.

4. A process according to claim 1, wherein the temperature of the molten bath is maintained at about 1000° C.

5. A process according to claim 1, wherein an oxidizing gas is injected into the molten bath concurrently with treatment with sulfur hexafluoride in order to remove sulfur and to aid in agitating said bath.

6. A process according to claim 5, wherein the oxidizing gas is air.

7. A process according to claim 1 or 5, wherein the bath is treated with sulfur hexafluoride gas by injecting said gas into the bath.

8. A process according to claim 1, wherein the base metal fluorides are removed from the silver by volatilization.

9. A process according to claim 1, wherein the base metal fluorides are removed from the silver by slagging; and wherein the slag containing said metal fluorides is separated from the purified silver.

10. A process according to claim 1, wherein no more than about 60 cubic centimeters of sulfur hexafluoride gas is used to treat each Troy ounce of the impure silver.

11. A process according to claim 1, wherein from about 13 to 60 cubic centimeters of sulfur hexafluoride gas is used to treat each Troy ounce of the impure silver.

12. A process according to claim 1 or 5, further comprising the step of treating the molten bath with a reducing agent so as to remove any oxygen and fluoride present in said bath.

13. A process according to claim 12, wherein the reducing agent is hydrogen gas.

14. A process according to claim 12, wherein the impurities are removed prior to treatment of the molten bath with the reducing agent.

* * * * *